(12) United States Patent
Ekanayake et al.

(10) Patent No.: US 11,209,883 B2
(45) Date of Patent: Dec. 28, 2021

(54) SNAP ON POWER OVER THE ETHERNET (POE) MONITOR SYSTEM

(71) Applicant: Elo Touch Solutions, Inc., Milpitas, CA (US)

(72) Inventors: Asela Ekanayake, Santa Clara, CA (US); Mohammad Fareeduddin, San Jose, CA (US); Brian Perry, San Jose, CA (US); Jake Yang, Taipei (TW); Ranil Fernando, Sunnyvale, CA (US)

(73) Assignee: Elo Touch Solutions, Inc., Milpitas, CA (US)

( * ) Notice: Subject to any disclaimer, the term of this patent is extended or adjusted under 35 U.S.C. 154(b) by 250 days.

(21) Appl. No.: 16/177,593

(22) Filed: Nov. 1, 2018

(65) Prior Publication Data
US 2020/0142464 A1  May 7, 2020

(51) Int. Cl.
G06F 1/28 (2006.01)
H02J 7/00 (2006.01)
H04L 12/10 (2006.01)
H02J 7/34 (2006.01)

(52) U.S. Cl.
CPC ............. G06F 1/28 (2013.01); H02J 7/0068 (2013.01); H04L 12/10 (2013.01); H02J 7/345 (2013.01)

(58) Field of Classification Search
CPC ....................................................... G06F 1/28
See application file for complete search history.

(56) References Cited

U.S. PATENT DOCUMENTS

| 7,650,519 B1* | 1/2010 | Hobbs ..................... G06F 1/266 713/300 |
| 2007/0283173 A1* | 12/2007 | Webb ...................... H04L 12/66 713/300 |
| 2017/0220101 A1 | 8/2017 | Brooks et al. |
| 2017/0250828 A1 | 8/2017 | Buchanan |

OTHER PUBLICATIONS

Schneuwly et al. "Properties and applications of supercapacitors From the state of-the-art to future trends". 2000. Proceeding PCIM 2000. Section 5.1.3 (Year: 2000).*

(Continued)

Primary Examiner — Kim Huynh
Assistant Examiner — Eric Chang
(74) Attorney, Agent, or Firm — Sterne, Kessler, Goldstein & Fox P.L.L.C.

(57) ABSTRACT

Some embodiments include a Power Over Ethernet (POE) monitor system powered by a POE signal. Some embodiments include a snap on POE module that is coupled to a monitor of the POE monitor system via a single connector without cabling. Some embodiments include creating and implementing a POE profile that specifies how power is utilized when the POE touchscreen system is powered by a POE-DC signal (e.g., reducing one or more of: a number of active USB ports, active audio devices, or touchscreen brightness to a %.) Some embodiments include detecting a power loss, and using one or more POE super capacitors to provide power for completion of critical functions that enable a graceful shut down. One or more of the POE super capacitors may be located in the snap on POE module, or in a main unit of the monitor.

20 Claims, 8 Drawing Sheets

(56) References Cited

OTHER PUBLICATIONS

Stepanov et al. "Development of supercapacitor based uninterruptible power supply". 2007. Riga Technical University/Institute of Electrical Engineering and Industrial Electronic. Sections 2 & 3 (Year: 2007).*
Marathon Power. "The Supercapacitor UPS Supergreen Energy Storage". 2013. https://web.archive.org/web/20130420191214/http://www.marathon-power.com/EN/UPSProducts/SupercapacitorUPS/SupercapacitorUPS.html (Year: 2013).*
International Search Report and Written Opinion of the International Searching Authority directed to related International Patent Application No. PCT/US2019/059442, dated Mar. 24, 2020; 13 pages.
Gurries, M., "Simple Battery Circuit Extends Power over Ethernet (POE) Peak Current—Design Note 361," *Linear Technology Design Notes*, Linear Technology Corporation, 2 pages, Copyright 2005.

\* cited by examiner

SNAP ON POWER OVER THE ETHERNET (POE) MONITOR SYSTEM

BACKGROUND

Field

The present disclosure relates generally to monitor systems, and more specifically to monitor systems with power over Ethernet (POE).

Background Art

Monitors are typically powered by an AC source that is converted to DC by a converter. With the availability of power over Ethernet (POE), there is a desire to power monitors via an Ethernet connection. This presents several problems. First, conventional monitors are designed to be powered by a DC power source and they cannot detect that a POE power source is available. Second, even if a monitor is powered by POE, the monitor is likely to demand more power than the limited POE power source; this may result in a shutdown of the monitor. Third, an immediate loss of POE power can result in critical data being lost. Finally, existing POE products that enable POE as a power source require a module with at least 3 cables that are not readily mounted on a monitoring device; a cumbersome eyesore at best.

SUMMARY

Some embodiments include a Power Over Ethernet (POE) monitor system that detects whether a monitor is powered by a DC Input signal source or by a POE-DC signal. Some embodiments include creating and implementing a POE profile that specifies how power is utilized when the POE monitor system is powered by a POE-DC signal. For example, a user may choose what monitor system capabilities remain active and which are limited or turned off in their POE profile (e.g., reducing one or more of: a number of active universal serial bus (USB) ports, active audio devices, or reducing screen brightness to a lower %.) Some embodiments include detecting a power loss, and using one or more POE super capacitors to enable critical functions of the monitor system. In some embodiments the POE super capacitor may be: included in a main unit of a monitor system that is separate from a POE module; the POE super capacitor may be included in a POE module such as a snap on POE module; and/or the POE super capacitor may be included in a single unit that combines both the POE module and the main unit.

Also, system, method, and computer program product embodiments are provided for a snap on POE monitor system. Some embodiments include receiving an Ethernet signal, transmitting a POE signal based on the Ethernet signal received to a POE module, and receiving a POE-DC signal from the POE module, where the POE-DC signal is based at least on the POE signal transmitted. Some embodiments further include determining that the POE-DC signal is a power source for the POE monitor system, and utilizing power associated with the POE-DC signal according to a POE profile wherein the utilized power does not exceed the power associated with the POE-DC signal. To determine that the POE-DC signal is the power source, embodiments include determining that a DC Input signal power source is not present. Embodiments may also include transmitting data from the Ethernet signal received to a local area network (LAN) processor.

Some embodiments further include determining the POE profile which includes receiving a selection of capabilities to be activated when the POE-DC signal is the power source, and updating the POE profile with the selection of capabilities received. Embodiments further include applying the selection of capabilities received to a POE budget, and determining that the POE budget is satisfied. Some embodiments may also include applying the selection of capabilities received to a POE budget, determining that the POE budget is not satisfied, and receiving an other selected capability which may be different than the selection of capabilities. In some embodiments, the other selected capability may be the same as a capability of the selection of capabilities.

Some embodiments further include providing an indication via a graphical user interface (GUI) to create the POE profile, and presenting a selection of capabilities to be available to satisfy a POE budget. Embodiments may include selecting the capabilities to be available via the GUI and a touchscreen. In some embodiments, the POE monitor system includes a monitor, a POE module coupled to the monitor via a single connector without cabling, and one or more processors communicatively coupled to the monitor. The POE monitor may snap onto the single connector without any cables. Embodiments may further include determining that the POE-DC signal is lost, and utilizing a super capacitor coupled to the one or more processors, to gradually power the POE monitor system down. The super capacitor may reside in a POE module, which may be a snap on POE module. Embodiments may include receiving a voltage output from the super capacitor, and utilizing the voltage output to perform critical functions before powering the POE monitor system down.

Embodiments may include providing capabilities based on a power availability of the power source. When the POE-DC signal is less than or equal to 15 watts, embodiments may be hard coded to include providing one or more of the following capabilities: LCD display, video, touchscreen, and Ethernet service. The POE monitor system capabilities may include at least one of: a speaker, an LCD display, an LED display, a video player, a touchscreen, an Ethernet interface, a USB port, a Bluetooth™ interface, a Wi-Fi™ interface, a peripheral, or a webcam.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

FIGS. 1A, 1B, and 1C illustrate a power over Ethernet (POE) monitor system, according to example embodiments of the disclosure;

Figure 1B:
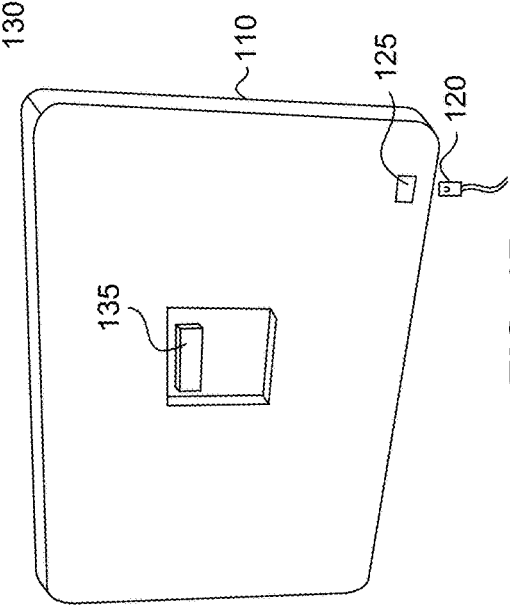

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The following Detailed Description of the present disclosure refers to the accompanying drawings that illustrate exemplary embodiments consistent with this disclosure. The exemplary embodiments will fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1C:
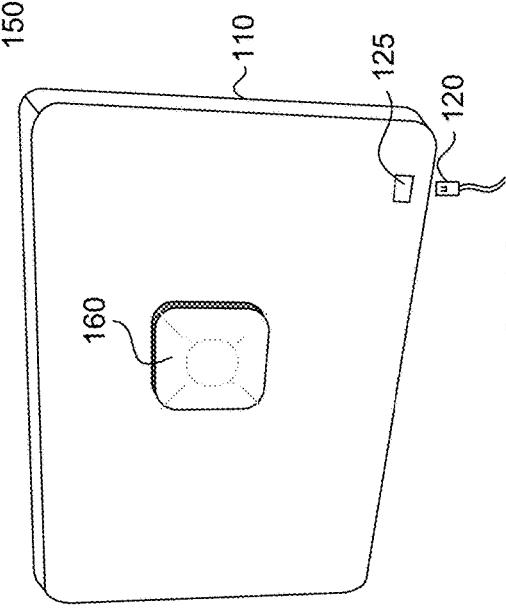
Figure 1A:
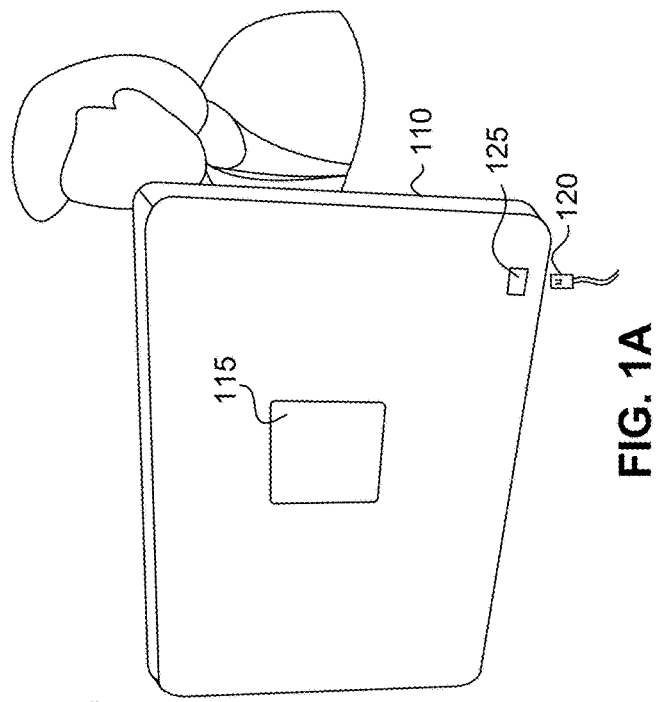

FIGS. 1A, 1B, and 1C illustrate power over Ethernet (POE) monitor systems 100, 130, and 150 respectively, according to example embodiments of the disclosure. POE monitor system 100 illustrates the rear of a monitor 110. User 105 views the display of monitor 110 on the opposite side. The display of monitor 110 may be an LCD display, an LED display, and/or include a touchscreen that overlays the display. Monitor 110 includes an Ethernet interface 125 that may be coupled to an Ethernet cable 120 with an RJ45 connector. Monitor 110 is typically powered by an AC source signal that is converted to DC Input signal (not shown). Monitor 110 may include a removable cover 115. POE monitor system 130 illustrates monitor 110 when cover 115 is removed to reveal a connector 135. POE monitor system 150 illustrates monitor 110 when POE module 160 is attached or snapped on via connector 135 without any cabling.

Figure 2:
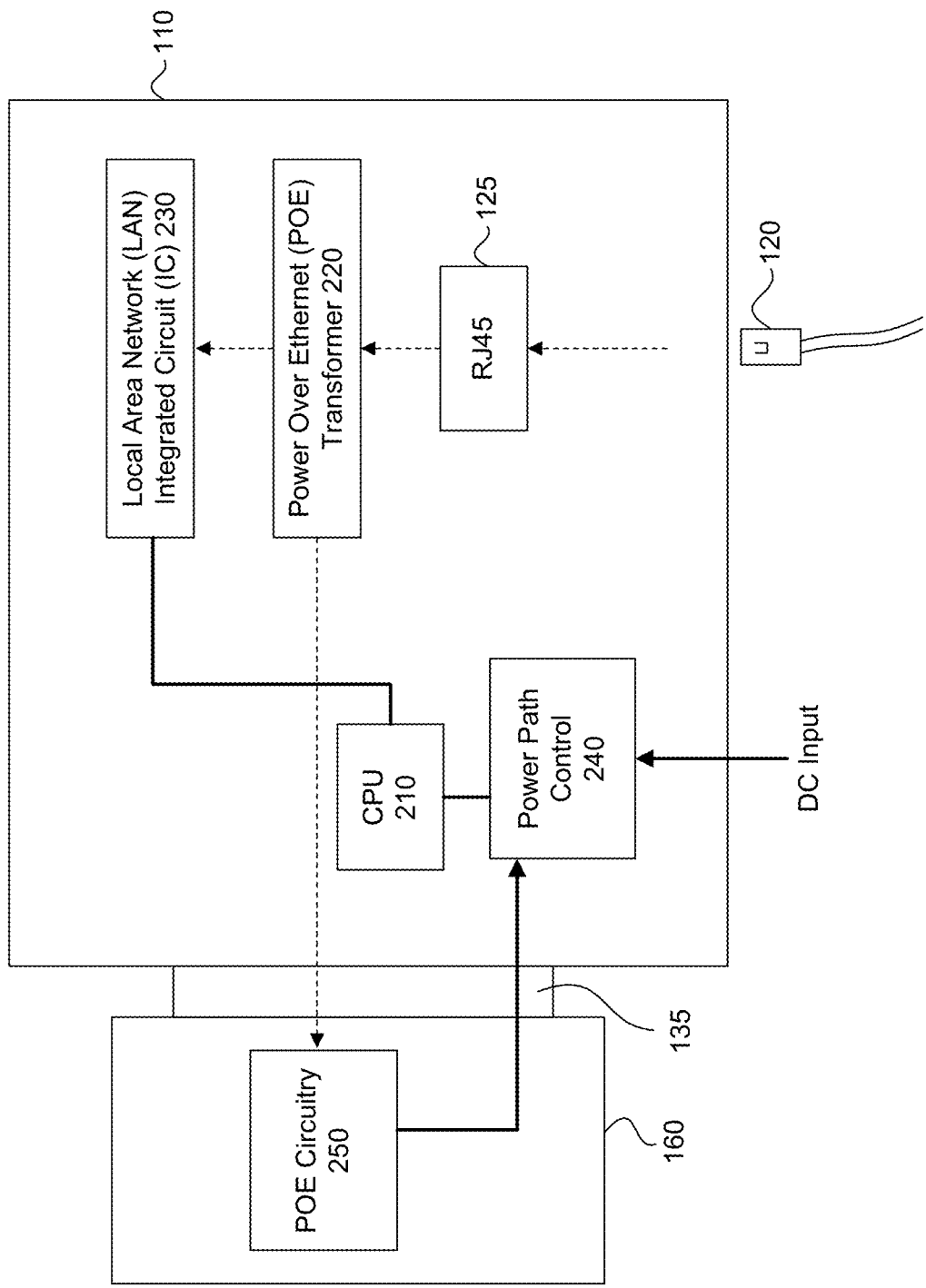
FIG. 2 illustrates an exemplary block diagram of a POE monitor system, according to an exemplary embodiment of the present disclosure.

FIG. 2 illustrates an exemplary block diagram of a POE monitor system 200, according to an exemplary embodiment of the present disclosure. For explanation purposes, FIG. 2 may be described with elements from previous figures. POE monitor system 200 includes monitor 110, POE module 160, connector 135, and Ethernet interface 125 (e.g., a receptor for an RJ45 connector) that may be coupled to an Ethernet cable 120 as described in FIGS. 1A-1C. Monitor 110 may include central processing unit (CPU) 210, POE transformer 220, local area network (LAN) integrated circuit (IC) 230, and power path control 240. POE module 160 may include POE circuitry 250. POE module 160 may be coupled to monitor 110 or a main unit of monitor 110 such as a printed circuit board via connector 135, a single connection without cables. Monitor 110 may be powered by DC Input signal (e.g., an AC power source converted to DC power.) Monitor 110 may also be powered via a POE-DC signal based at least on an Ethernet signal received at Ethernet interface 125. When monitor 110 is powered by both a DC Input signal and a POE-DC signal, monitor 110 may utilize the capabilities provided by the highest power source (e.g., the DC Input signal.)

CPU 210 may include one or more processors that are coupled to and control at least one of the following: power usage, video output, display (e.g., % brightness), audio (e.g., control a number of speakers that are active and dB), and other interfaces (e.g., a number of active USBs). POE transformer 220 may receive an Ethernet signal via Ethernet interface 125. POE transformer 220 may transmit data-related portions of the Ethernet signal received to LAN IC 230 and transmit a POE signal based on the Ethernet signal received to POE circuitry 250. The Ethernet signal, portions of the Ethernet signal, and the POE signal are shown as dashed arrows. The data-related portions of the Ethernet signal transmitted to LAN IC 230 may include data packets and associated control signaling. The POE signal transmitted to POE Circuitry 250 may include power information associated with the Ethernet signal received by POE transformer 220. LAN IC 230 performs LAN functions (e.g., data packet processing, WiFi™ data packet processing.) POE Circuitry 250 receives the POE signal that includes power information and converts the POE signal to a DC voltage, herein called the POE-DC signal. The POE-DC signal has a lower DC voltage than a DC Input signal (converted from an AC source). Power path control 240 receives the POE-DC signal from POE circuitry 250. Power path control 240 may also receive a DC Input signal. Power path control 240 determines which of the available power sources POE monitor system 200 will utilize. Thus, POE monitor system 200 can switch between a DC Input signal power source and a POE-DC signal power source.

Figure 3:
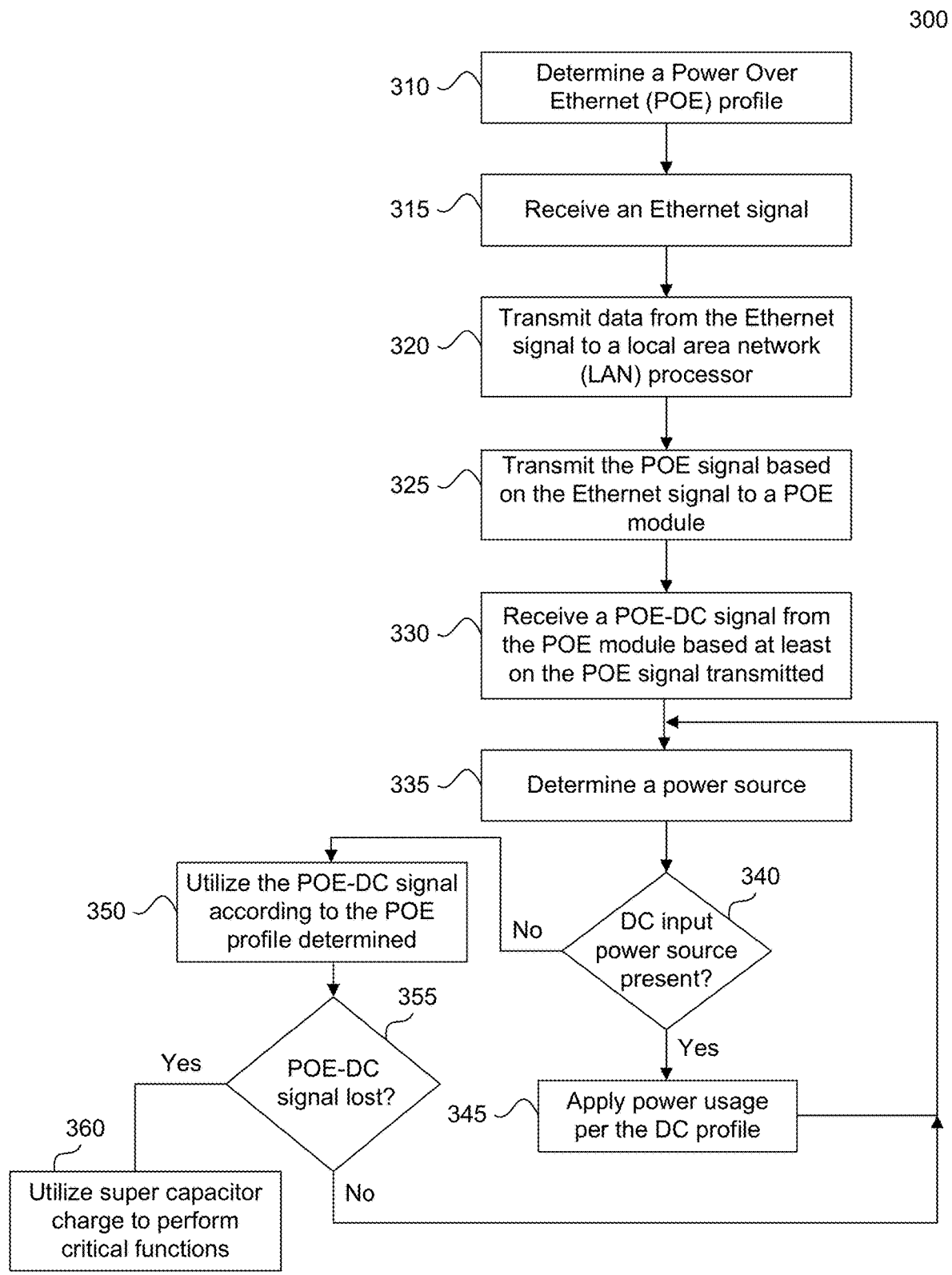
FIG. 3 illustrates a method for a POE monitor system, according to example embodiments of the disclosure.

FIG. 3 illustrates a method 300 for a POE monitor system 200, according to example embodiments of the disclosure. For explanation purposes, FIG. 3 may be described with elements from figures within this disclosure. For example, method 300 may be performed by monitor 110 of FIG. 1, monitor 510 of FIG. 5, or monitor 610 of FIG. 6.

At 310, monitor 110 may determine a POE profile. For example, CPE 210 may determine a POE profile that indicates which capabilities are to be used when a POE-DC signal is the power source. Since the DC voltage of a POE-DC signal is lower than that of a DC Input signal (e.g., converted from an AC source), the capabilities of monitor 110 may be adjusted (e.g., lowered) to prevent the capabilities (e.g., features of monitor 110) from drawing more power than the POE-DC signal can provide. Without the prevention, monitor 110 would shut down from the power over draw. The POE profile may direct how monitor 110 uses the power associated with the POE-DC signal as the power source. A POE profile may be: hard coded based on the available wattage, variable based on the available wattage, or a combination of hard coded and variable capabilities based on the available wattage. Examples of hard coded capabilities of a POE profile may be as follows: When the POE-DC signal comprises 15 W or less, then an LCD display and touchscreen capabilities may be active and available. When the POE-DC signal is less than or equal to 30 W, then an LCD display, touchscreen capabilities, and audio capabilities (e.g., speakers) may be active and available. The hard coded capabilities may be pre-defined and set during manufacturing.

The POE profile may include variable capabilities (e.g., software based and programmable capabilities) based on the available power (e.g., wattage.) In some embodiments the variable capabilities may be: pre-defined and set during manufacturing, selected by a user, or a combination of both. The functions for selecting the variable capabilities of the POE profile by a user may be included in monitor 110, on an external server (e.g., a cloud server), or a combination of both.

At 315, monitor 110 may receive an Ethernet signal. For example, POE transformer 220 may receive an Ethernet signal via Ethernet interface 125.

At 320, monitor 110 may transmit data from the Ethernet signal to a local area network (LAN) processor. For example, POE transformer 220 may process the received Ethernet signal and transmit data such as data packets and control signaling to LAN IC 230.

At 325, monitor 110 may transmit a POE signal based on the Ethernet signal to a POE module. For example, POE transformer 220 may process the received Ethernet signal and transmit a POE signal to POE circuitry 250. POE circuitry 250 receives and converts the POE signal to DC voltage, and the output from POE circuitry 250 is called a POE-DC signal.

At 330, monitor 110 may receive a POE-DC signal from the POE module, where the POE-DC signal is based at least on the POE signal transmitted. For example, power path control 240 may receive the POE-DC signal from POE circuitry 250.

At 335, monitor 110 may determine a power source to be used for POE monitor system 200. For example, power path control 240 may sense the power sources available (e.g., DC Input signal and/or POE-DC signal) and determine which to use.

At 340, monitor 110 may determine whether a DC Input power source is present. When a DC power source is present, method 300 proceeds to 345. Otherwise, method 300 proceeds to 350.

At 345, when a DC Input signal power source is present, monitor 110 proceeds to use the DC Input power source according to a DC profile. The DC profile makes available capabilities that satisfy a power budget of approximately 60 W.

Returning to 350, when a DC Input power source is not present, monitor 110 proceeds to utilize the POE-DC signal according to the POE profile determined. For example, CPU 210 applies the POE profile to determine which capabilities are made available.

At 355, monitor 110 determines if the POE-DC signal is lost. When the POE-DC signal is not lost, method 300 returns to 335 to verify that the power source has not changed. When the POE-DC signal is lost, method 300 proceeds to 360.

At 360 when the POE-DC signal is lost, monitor 110 may utilize a charge from a super capacitor to perform critical functions before POE monitor system 200 is powered down. The critical functions may include providing enough power to CPU 210 and/or memory to save key data. The super capacitor is described further in FIGS. 5-7.

Figure 5:
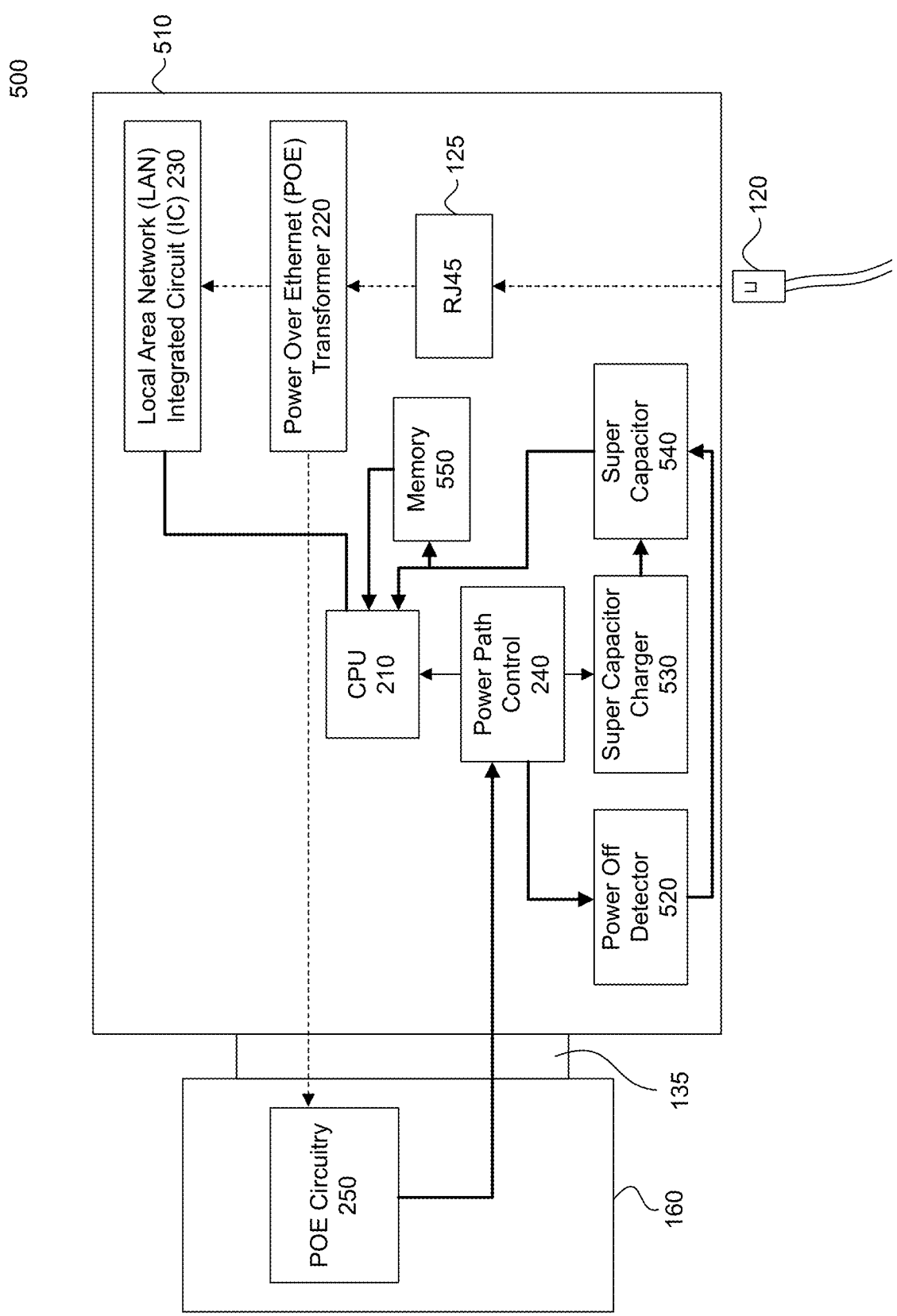
FIG. 5 illustrates an exemplary block diagram of a POE monitor system with a super capacitor in a main unit, according to example embodiments of the disclosure.

FIG. 5 illustrates an exemplary block diagram of a POE monitor system 500 with a super capacitor in a main unit, according to example embodiments of the disclosure. For explanation purposes, FIG. 5 may be described with elements from previous figures. POE monitor system 500 includes monitor 510, POE module 160, connector 135, and Ethernet interface 125 (e.g., a receptor for an RJ45 connector) that may be coupled to an Ethernet cable 120 as described in FIGS. 1A-1C. Monitor 510 may include the elements of monitor 110: CPU 210, POE transformer 220, LAN IC 230, and power path control 240. POE module 160 may include POE circuitry 250. POE module 160 may be coupled to monitor 510 or a main unit of monitor 510 such as a printed circuit board via connector 135, a single connection without cables. Monitor 510 may be powered by a DC Input signal or by a POE-DC signal.

Monitor 510 may include memory 550 coupled to CPU 210, and super capacitor 540. Memory 550 may include different types of memory including but not limited to random access memory (RAM), cache, an embedded multimedia controller (eMMC), or secondary storage. Monitor 510 also includes power off detector 520, super capacitor charger 530, and super capacitor 540. Power off detector 520 may be coupled to power path control 240 and super capacitor 540. Power off detector 520 determines when a POE-DC signal is lost. Super capacitor charger 530 is may be coupled to power path control 240 and super capacitor 540. Super capacitor charger 530 receives power from power path control 240 and charges super capacitor 540. Super capacitor 540 is coupled to super capacitor charger 530, power off detector 520, as well as CPU 210 and memory 550. Super capacitor 540 retains a substantial charge and is able to provide power to CPU 210 and memory 550 for a few seconds after a POE-DC signal is lost to enable a graceful shutdown of POE monitor system 500.

As described above, the output of POE circuitry 250 is a POE-DC signal of (e.g., 19 V) that is transmitted to power path control 240. Power path control 240 provides power to power off detector 520 and super capacitor charger 530 that charges super capacitor 540. When an Ethernet connection is lost, POE-DC signal is lost, and power path control 240 will not receive any power. Power off detector 520 determines that power is lost from power path control 240, and notifies super capacitor 540. In turn, super capacitor 540 discharges enough power (e.g., 1.8 V or 3.3 V) to CPU 210 and memory 550 for a few seconds to enable critical functions to be performed. The critical functions may include writing crucial data to memory 550 so that when power is restored (e.g., POE-DC signal or DC Input signal), monitor 510 can readily resume operation. Examples of critical functions may include view settings, list of applications running, and/or unsaved files.

Figure 6:
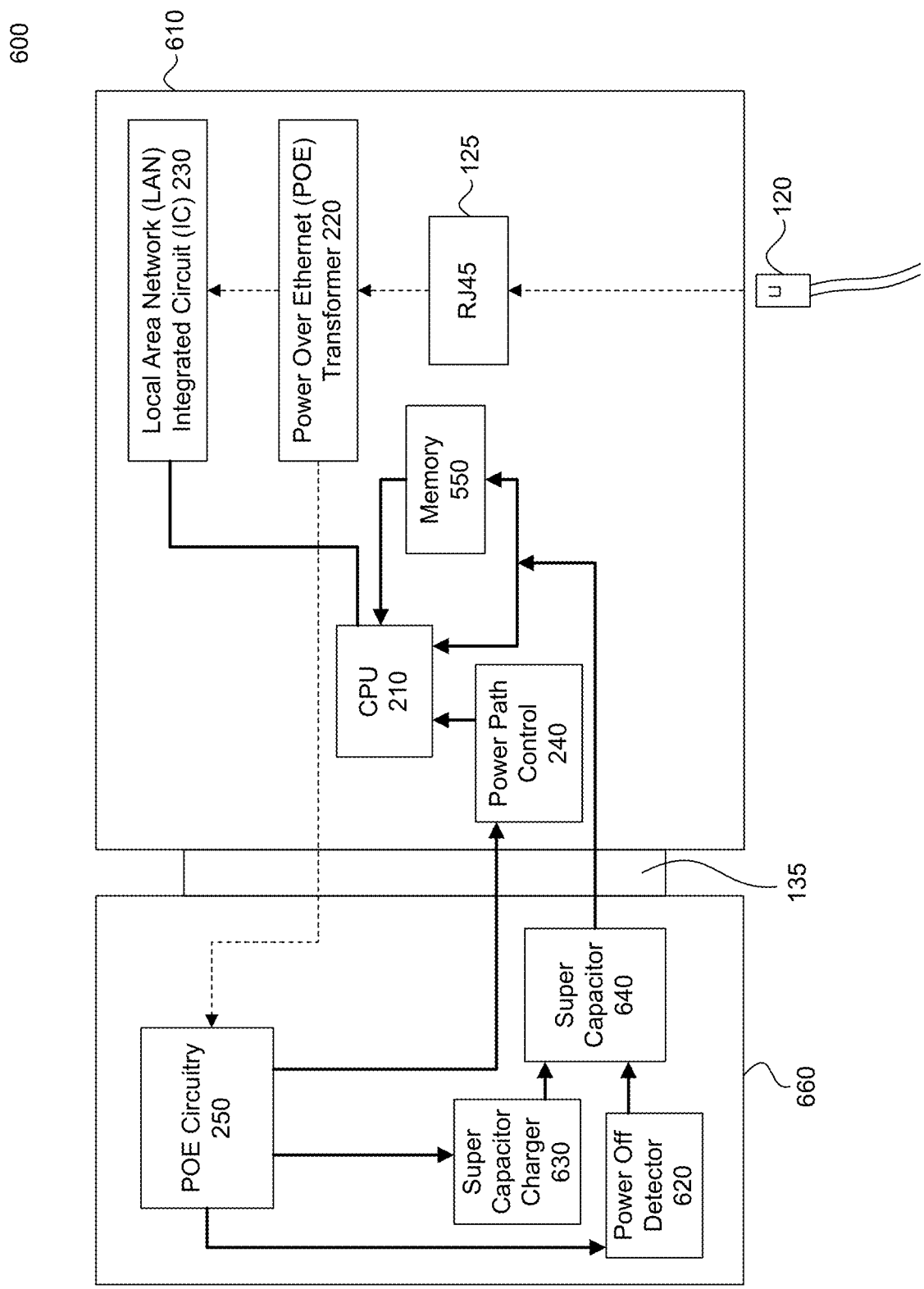
FIG. 6 illustrates an exemplary block diagram of a POE monitor system with a super capacitor in a POE module, according to example embodiments of the disclosure.

FIG. 6 illustrates an exemplary block diagram of a POE monitor system 600 with a super capacitor in a POE module, according to example embodiments of the disclosure. For explanation purposes, FIG. 6 may be described with elements from previous figures. POE monitor system 600 includes monitor 610, connector 135, and Ethernet interface 125 (e.g., a receptor for an RJ45 connector) that may be coupled to an Ethernet cable 120 as described in FIGS. 1A-1C. Monitor 510 may include: CPU 210, POE transformer 220, LAN IC 230, power path control 240, and memory 550. POE module 660 may include POE circuitry 250. POE module 660 may be coupled to monitor 610 or a main unit of monitor 610 such as a printed circuit board via connector 135, a single connection without cables. Monitor 610 may be powered by a DC Input signal or by a POE-DC signal.

POE module 660 may also include power off detector 620, super capacitor charger 630, and super capacitor 640. Power off detector 620 may be coupled to POE circuitry 250 and super capacitor 640. Power off detector 620 determines when a power (e.g., a POE-DC signal or a POE signal) is lost. Super capacitor charger 630 may be coupled to POE circuitry 250 and super capacitor 640. Super capacitor charger 630 receives power from POE circuitry 250 and charges super capacitor 640. Super capacitor 640 is coupled to super capacitor charger 630, power off detector 620, as well as CPU 210 and memory 550. Super capacitor 640 retains a substantial charge and is able to provide power to CPU 210 and memory 550 for a few seconds after a POE-DC signal is lost to enable a graceful shutdown of POE monitor system 600.

As described above, the output of POE circuitry 250 is a POE-DC signal of (e.g., 19 V) that is transmitted to power path control 240. In addition, POE circuitry 250 provides power to power off detector 620 and super capacitor charger 630 that charges super capacitor 640. When an Ethernet connection is lost, a corresponding POE-DC signal is lost, and power path control 240 will not receive any power. Power off detector 620 determines that power is lost from POE circuitry 250, and notifies super capacitor 640. In turn, super capacitor 640 discharges enough power (e.g., 1.8 V, 3.3 V, or 5V) to CPU 210 and memory 550 for a few seconds to enable critical functions to be performed. The critical functions may include writing crucial data to memory 550 so that when power is restored (e.g., POE-DC signal or DC Input signal), monitor 610 can readily resume operation.

Figure 7:
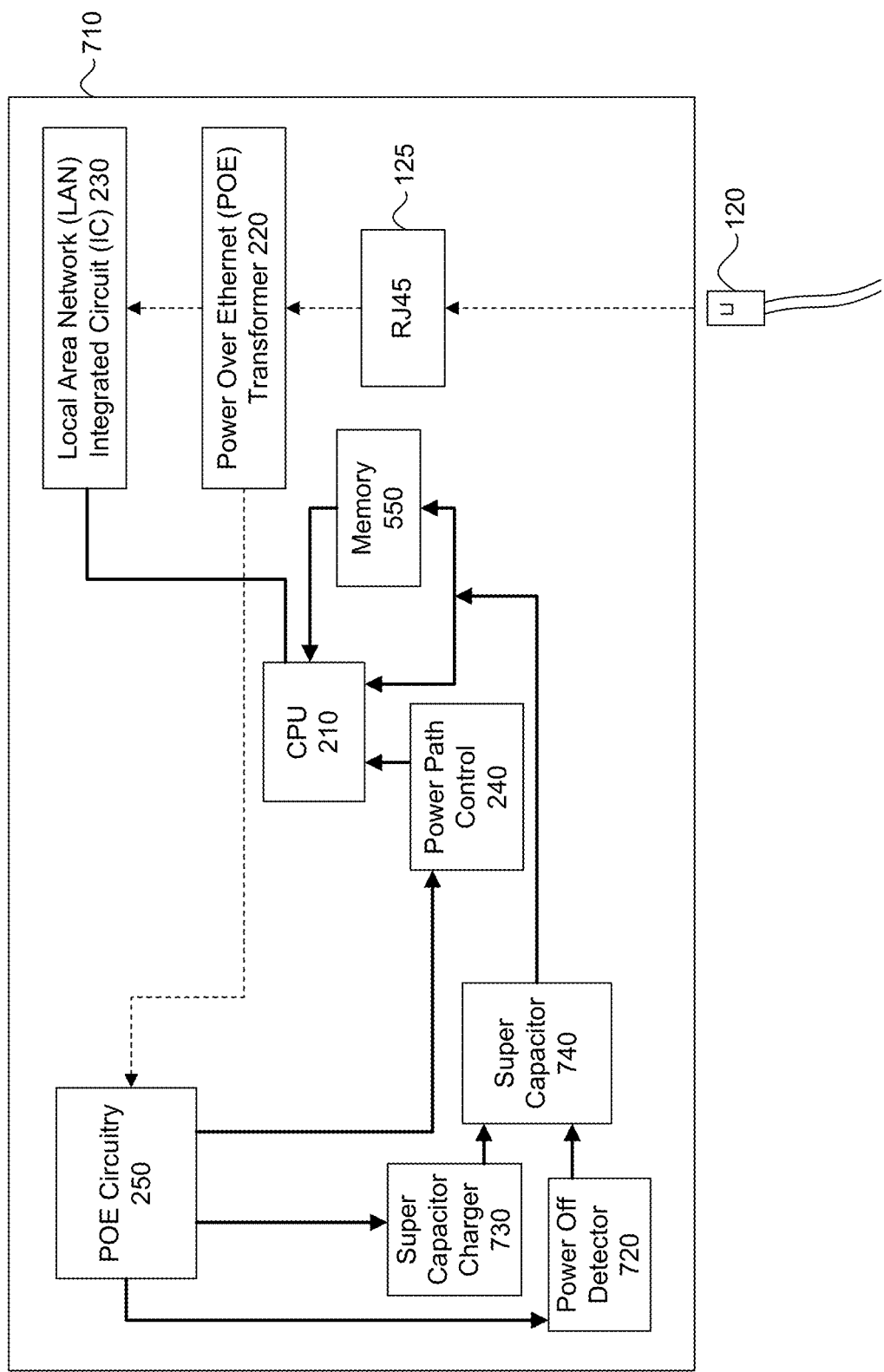
FIG. 7 illustrates an exemplary block diagram of a POE monitor system with a super capacitor in a single unit that combines a POE module and a main unit, according to example embodiments of the disclosure.

FIG. 7 illustrates an exemplary block diagram of a POE monitor system 700 with a super capacitor in a single unit that combines a POE module and a main unit, according to example embodiments of the disclosure. For explanation purposes, FIG. 7 may be described with elements from previous figures. POE monitor system 700 includes monitor 710 and Ethernet interface 125 (e.g., a receptor for an RJ45 connector) that may be coupled to an Ethernet cable 120 as described in FIGS. 1A-1C. Monitor 710 may include: CPU 210, POE transformer 220, LAN IC 230, power path control 240, memory 550, and POE circuitry 250. Monitor 710 may be powered by DC Input or by a POE-DC signal.

Monitor 710 may include power off detector 720, super capacitor charger 730, and super capacitor 740. Power off detector 720 may be coupled to POE circuitry 250 and super capacitor 740. Power off detector 720 determines when a POE-DC signal is lost. Super capacitor charger 730 may be coupled to POE circuitry 250 and super capacitor 740. Super capacitor charger 730 receives power from POE circuitry 250 and charges super capacitor 740. Super capacitor 740 is coupled to super capacitor charger 730, power off detector 720, as well as CPU 210 and memory 550. Super capacitor 740 retains a substantial charge and is able to provide power to CPU 210 and memory 550 for a few seconds after a POE-DC signal is lost to enable a graceful shutdown of POE monitor system 700.

As described above, the output of POE circuitry 250 is a POE-DC signal of (e.g., 19 V) that is transmitted to power path control 240. In addition, POE circuitry 250 provides power to power off detector 720 and super capacitor charger 730 that charges super capacitor 740. When an Ethernet connection is lost, a corresponding POE-DC signal is lost, and power path control 240 will not receive any power. Power off detector 720 determines that power is lost from POE circuitry 250, and notifies super capacitor 740. In turn, super capacitor 740 discharges enough power (e.g., 1.8 V, 3.3 V, or 5V) to CPU 210 and memory 550 for a few seconds to enable critical functions to be performed. The critical functions may include writing crucial data to memory 550 so that when power is restored (e.g., POE-DC signal or DC Input signal), monitor 710 can readily resume operation.

Figure 4:
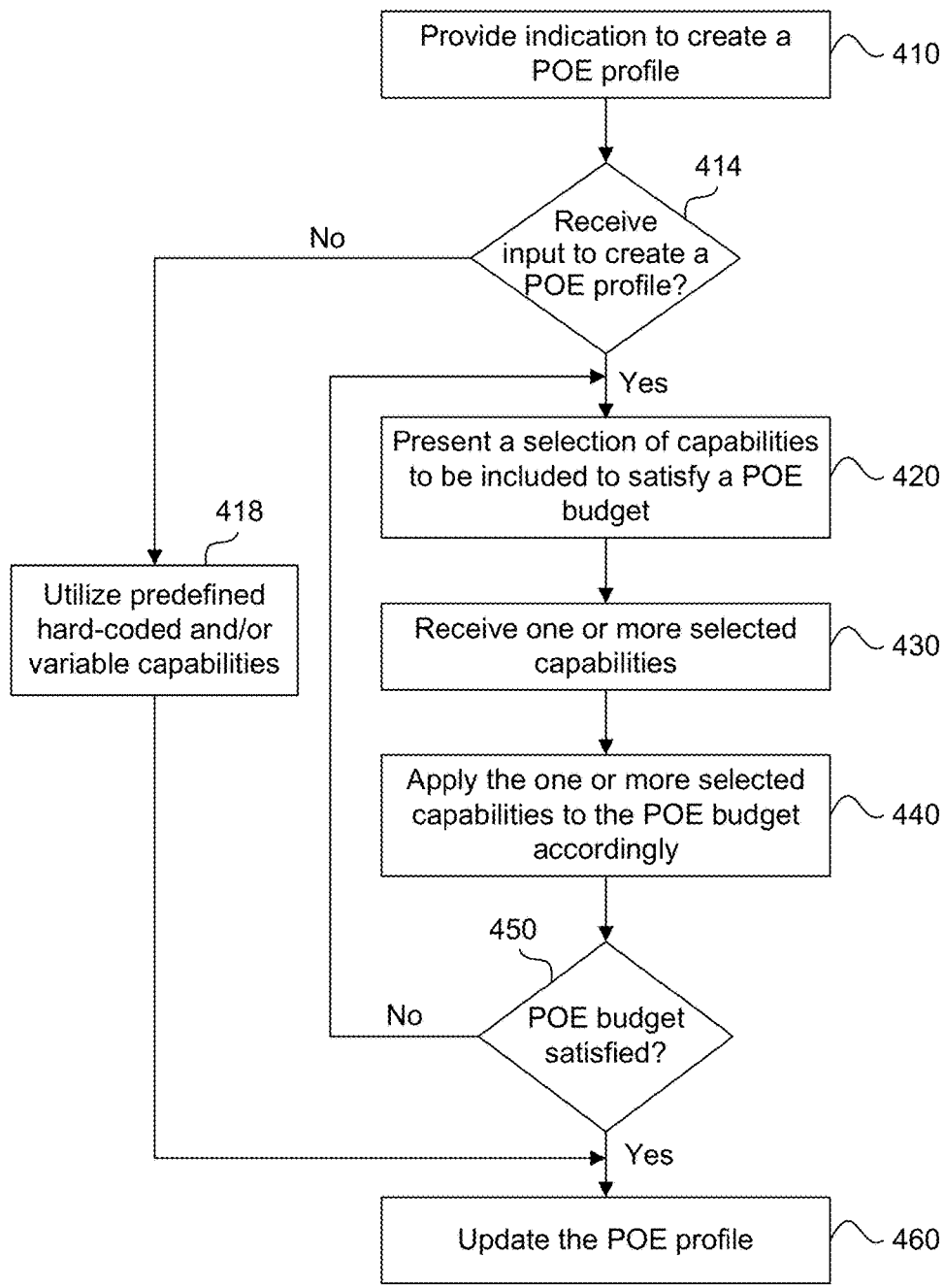
FIG. 4 illustrates a method for determining a POE profile, according to example embodiments of the disclosure.

FIG. 4 illustrates a method 400 for determining a POE profile, according to example embodiments of the disclosure. For explanation purposes, FIG. 4 may be described with elements from previous figures. For example, method 400 may be performed by monitor 110 of FIG. 1, monitor 510 of FIG. 5, monitor 610 of FIG. 6, and monitor 710 of FIG. 7. As an example and not a limitation, the disclosure refers to monitor 110.

At 410, monitor 110 may provide an indication to create a POE profile. For example, CPE 210 may determine that monitor 110 may be powered by a POE-DC signal and provide an indication on a display of monitor 110 that the user may create a POE profile. CPE 210 may be coupled to a display of monitor 110, and CPE 210 may cause the indication to be presented on the display of monitor 110.

At 414, monitor 110 may determine whether input to create a POE profile has been received. For example, when a user selects an indication to not create a POE profile, or when the user does not make a selection (e.g., a timer expires and no indication has been selected) method 400 may proceed to 418. When a user selects an indication to create a POE profile, method 400 proceeds to 420.

At 418, when a user chooses to not create a POE profile or does not make a selection, monitor 110 may utilize hard coded capabilities and/or variable capabilities that are predefined and set during manufacturing. For example, CPU 210 may utilize the hard coded capabilities and/or variable capabilities that may be stored in memory (e.g., like memory 550 of FIG. 5) that are pre-defined and may be set during manufacturing. In some embodiments the variable capabilities may be provisioned by an administrator via an external server (e.g., a cloud server not shown.)

Returning to 420, monitor 110 may present a selection of capabilities to be included to satisfy a POE budget. The POE budget is associated with the available power or maximum available power of the POE-DC signal which is less than the available power of a DC Input signal. For example, CPE 210 may be coupled to a display of monitor 110, and CPE 210 may cause a selection of capabilities to be presented on the display of monitor 110. In some embodiments the selection may be presented on a touchscreen via a graphical user interface (GUI.)

At 430, monitor 110 may receive one or more selected capabilities. A user may select one or more capabilities to be available according to the available power of the POE-DC signal. A maximum available POE-DC signal power may be 25.5 W, and may be called the POE budget. A POE profile may have a settable number of groupings of capabilities based on the available power of the POE-DC signal. For example, when the number of groupings is set to 3, the groupings may include: capabilities that are always available; capabilities that may be disabled when not enough power is available; and capabilities that are disabled. Examples of the variable capabilities include at least one of: a speaker, an LCD display, an LED display, a video player, a touchscreen, an Ethernet interface, a USB port, a Bluetooth™ interface, a Wi-Fi™ interface, a peripheral, or a webcam. The variable capabilities may also include different percentages of brightness for a display of monitor 110. A user may choose the variable capabilities (e.g., drag and drop variable features from lists on a GUI to prioritize power availability for monitor 110. In this example, the user may choose the following selections that are received by CPU 210 via a display of monitor 110:

- Capabilities that are always available: LCD display (10 W) touch screen controller (3 W), and speakers (10 W). Power usage total is 23 W.
- Capabilities that may be disabled when not enough power is available: Ethernet (5 W), WiFi™ (3 W), and USB (2.5 W). Power usage total is 10.5 W.
- Capabilities that are disabled: Bottom peripheral (2.5 W), left peripheral (2.5 W), right peripheral (2.5 W), and webcam (3 W). Total power usage is 10.5 W.

In this example, the capabilities that are always available power usage total is 23 W that is less than the POE budget of 25.5 W. Thus, the POE budget is satisfied.

In a second example, there may be only one group and the variable choices are listed in the group with their power usage in watts. The user is directed to make selections to identify the capabilities that satisfy a POE budget (e.g., of 20 W.) In the second example, based on a 20 Watt POE-DC signal, a user may choose the following variable capabilities to be available in their POE profile: 50% of the speakers (2 W), 100% brightness of the LCD display (10 W), a WiFi™ interface (2 W), two USB interfaces (5 W), and a Bluetooth™ interface (1 W). Unselected variable capabilities may remain in the list.

At 440, monitor 110 applies the one or more selected capabilities to the POE budget accordingly. For example, CPE 210 may sum the wattage of the variable capabilities and determine whether the selected capabilities satisfy the POE budget that enables a positive user experience. Satisfying means that the total sum of the wattage for each group of capabilities to be active are less than the POE budget. In some embodiments the total sum of the wattage for each group of capabilities are less than the POE budget and greater than a minimum wattage. The minimum wattage may be for example, equal to the wattage of one or more hard coded capabilities.

At 450, monitor 110 determines whether the POE budget is satisfied. When the POE budget is satisfied, method 400 proceeds to 460. When the POE budget is s not satisfied, method 400 returns to 420 and presents instructions on a display of monitor 110 for adjusting the wattage accordingly to lower the total wattage, or in some cases, to increase the total wattage to satisfy a minimum wattage.

At 460, monitor 110 updates the POE profile. For example, CPE 210 may save the POE profile to memory (e.g., memory 550 of FIG. 5.)

Figure 8:
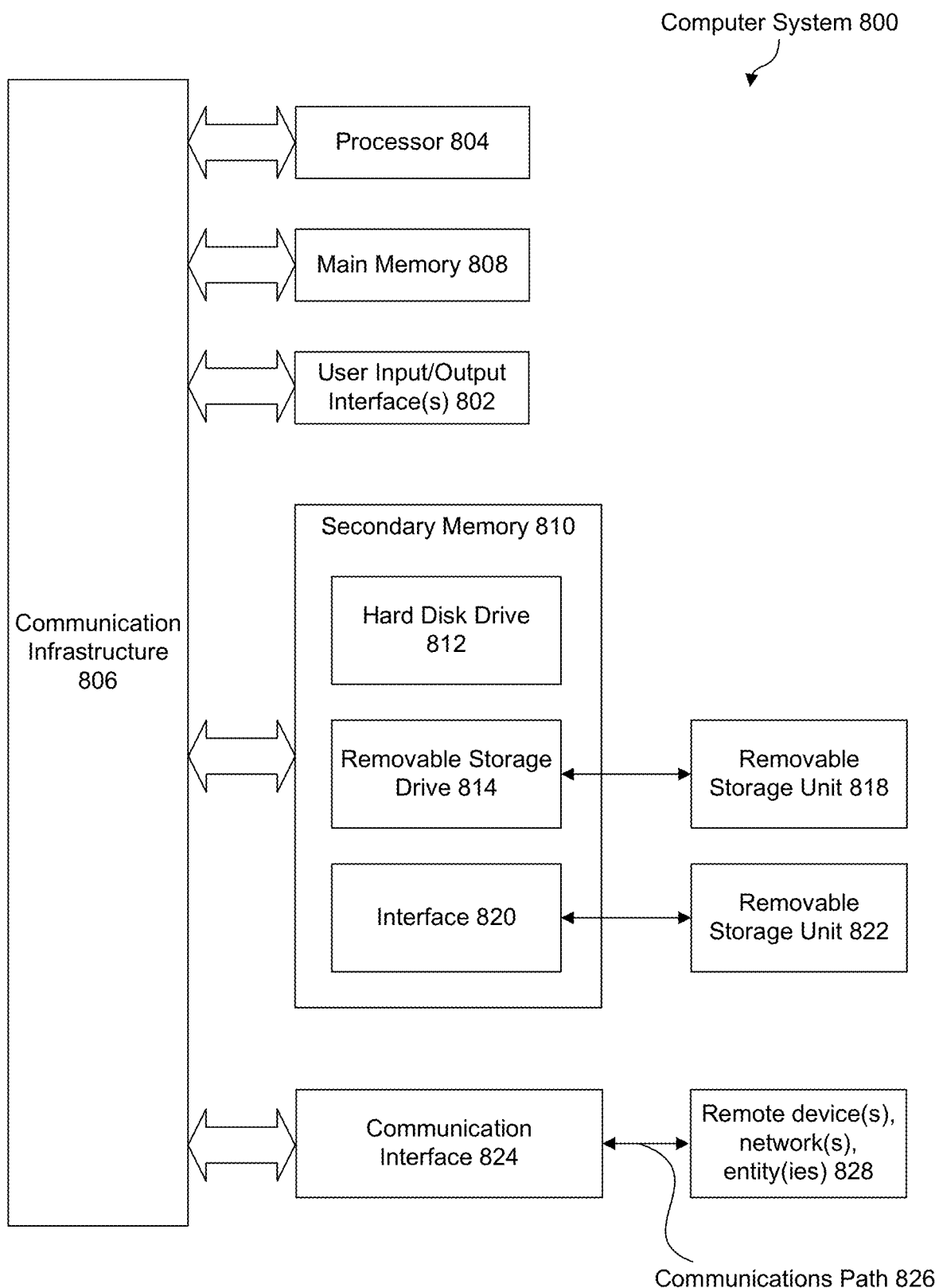
FIG. 8 illustrates an example computer system useful for implementing various embodiments.

Various embodiments can be implemented, for example, using one or more well-known computer systems, such as computer system 800 shown in FIG. 8. Computer system 800 can be any well-known computer capable of performing the functions described herein such as main unit 110, POE module 160, and methods 300 and/or 400 described above.

Computer system 800 includes one or more processors (also called central processing units, or CPUs), such as a processor 804. Processor 804 is connected to a communication infrastructure or bus 806. One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. Computer system 800 also includes user input/output device(s) 802, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data. Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive. Main memory 808 and/or secondary memory 810 may include an embedded multi-media controller (eMMC).

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 414 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

The foregoing description, for purposes of explanation, used specific nomenclature to provide a thorough understanding of the disclosure. However, it will be apparent to one skilled in the art that specific details are not required in order to practice the disclosure. Thus, the foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the following claims and their equivalents define the scope of the disclosure.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with their recitations and their equivalents.

What is claimed is:

1. A power over Ethernet (POE) monitor system, comprising:
   a monitor comprising a single connector for connecting a POE module;
   the POE module coupled to the monitor via the single connector without cabling;
   one or more processors communicatively coupled to the monitor; and
   a super capacitor coupled to the one or more processors, wherein the one or more processors are configured to:
      receive an Ethernet signal;
      transmit a POE signal based on the Ethernet signal received, to the POE module;
      receive a POE-DC signal from the POE module, wherein the POE-DC signal is based at least on the POE signal transmitted;
      determine that the POE-DC signal is a power source;
      utilize power associated with the POE-DC signal according to a POE profile wherein the utilized power does not exceed the POE-DC signal;
      determine that the POE-DC signal is lost; and
      utilize the super capacitor to gradually power the POE monitor system down.

2. The POE monitor system of claim 1, wherein the one or more processors are further configured to determine the POE profile.

3. The POE monitor system of claim 2, wherein to determine the POE profile, the one or more processors are configured to:
   receive a selection of capabilities to be activated when the POE-DC signal is the power source; and
   update the POE profile with the selection of capabilities received.

4. The POE monitor system of claim 3, wherein the one or more processors are further configured to:
   apply the selection of capabilities received to a POE budget; and
   determine that the POE budget is satisfied.

5. The POE monitor system of claim 3, wherein the one or more processors are further configured to:
   apply the selection of capabilities received to a POE budget;
   determine that the POE budget is not satisfied; and
   receive another selected capability.

6. The POE monitor system of claim 3, further comprising a graphical user interface (GUI) coupled to the one or more processors, wherein the one or more processors are further configured to:
   provide an indication via the GUI to create the POE profile; and
   present a selection of capabilities to be active to satisfy a POE budget.

7. The POE monitor system of claim 6, further comprising a touchscreen coupled to the one or more processors, wherein the selection of capabilities to be activated is received via the GUI and the touchscreen.

8. The POE monitor system of claim 1, wherein the one or more processors are further configured to transmit data from the Ethernet signal received to a local area network (LAN) processor.

9. The POE monitor system of claim 1, wherein when the super capacitor resides in the POE module, to utilize the super capacitor, the one or more processors are configured to:
   receive a voltage output from the super capacitor; and
   utilize the voltage output to perform critical functions before powering the POE monitor system down.

10. The POE monitor system of claim 9, wherein to perform the critical functions, the one or more processors are configured to:
    write crucial data in memory coupled to the one or more processors, wherein the crucial data comprises: settings, a list of applications running, or unsaved files.

11. The POE monitor system of claim 9, wherein the one or more processors are further configured to:
    determine that power is restored; and
    resume operation based at least on the critical data.

12. The POE monitor system of claim 1, wherein to determine that the POE-DC signal is the power source, the one or more processors are configured to determine that a DC Input signal power source is not present.

13. The POE monitor system of claim 1, wherein the one or more processors are further configured to provide capabilities based on a power availability of the power source.

14. The POE monitor system of claim 13, further comprising a touchscreen coupled to the one or more processors, wherein the POE-DC signal is less than or equal to 15 watts, the one or more processors are configured to provide the following capabilities: LCD display, video, touchscreen, and Ethernet service.

15. The POE monitor system of claim 13, wherein the capabilities comprise at least one of: a speaker, an LCD display, a video player, a touchscreen, an Ethernet interface, a USB port, a Bluetooth™ interface, a Wi-Fi™ interface, a peripheral, or a webcam.

16. The POE monitor system of claim 1, wherein the single connector is coupled to a printed circuit board of the monitor.

17. A method for a power over Ethernet (POE) monitor system, comprising:
   receiving an Ethernet signal at a monitor comprising a single connector for connecting a POE module;
   transmitting a POE signal based on the Ethernet signal received to the POE module, wherein the POE module is coupled to the monitor via the single connector without cabling;
   receiving a POE-DC signal from the POE module, wherein the POE-DC signal is based at least on the POE signal transmitted;
   determining that the POE-DC signal is a power source;
   utilizing the POE-DC signal according to a POE profile wherein the utilization does not exceed the POE-DC signal;
   determining that the POE-DC signal is lost; and
   utilizing a super capacitor to gradually power the POE monitor system down.

18. The method of claim 17, further comprising determining the POE profile, comprising:
   receiving a selection of capabilities to be available when the POE-DC signal is the power source; and
   updating the POE profile with the selection of capabilities received.

19. The method of claim 17, wherein the utilizing comprises:
   receiving a voltage output from the super capacitor; and
   utilizing the voltage output to perform critical functions before powering the POE monitor system down.

20. A power over Ethernet (POE) module comprising:
   a super capacitor; and
   one or more processors coupled to the super capacitor, wherein the one or more processors are configured to:
   receive a POE signal from a monitor comprising one connector for connecting a POE module, wherein the POE signal is based on an Ethernet signal received by the monitor, and wherein the POE module is coupled to the monitor via the one connector without cables;
   generate a POE-DC signal based on the POE signal received;
   transmit the POE-DC signal to the monitor via the one connector without cables, wherein the POE-DC signal is a power source for the monitor;
   determine that power is lost; and
   utilize the super capacitor to gradually power down the monitor via the one connector without cables.

* * * * *